June 3, 1947.　　　M. SCHWARTZ ET AL　　　2,421,396
ELECTRICALLY CONTROLLED CAMERA
Filed April 14, 1944
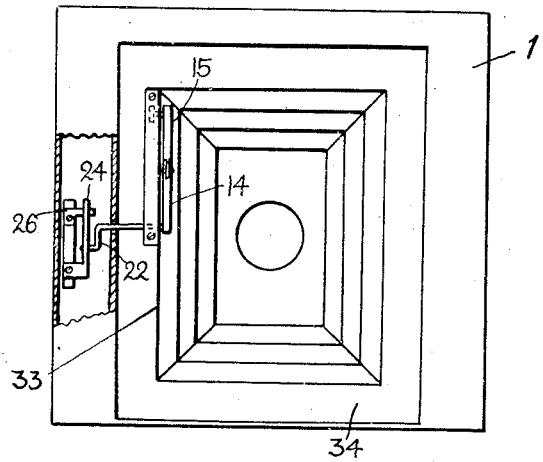
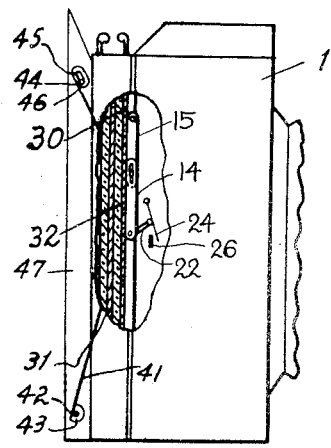
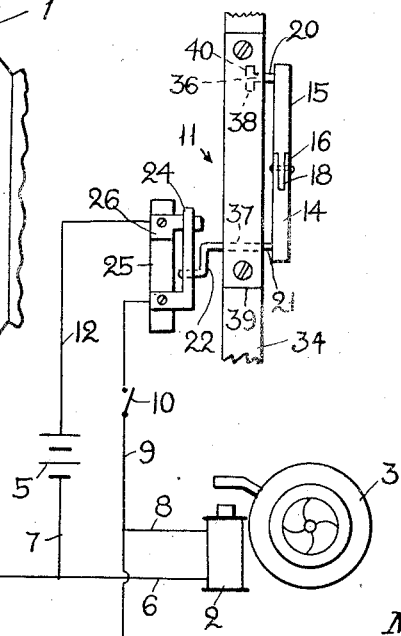
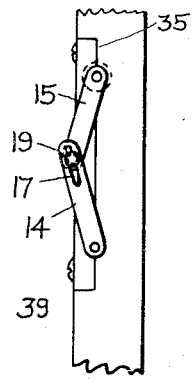
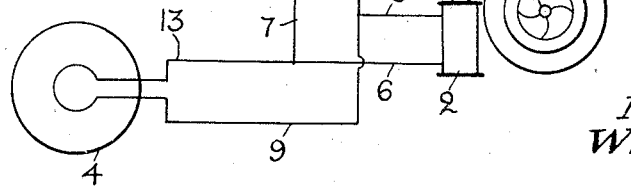
Morris Schwartz
William Castedello
INVENTORS Patented June 3, 1947

2,421,396

UNITED STATES PATENT OFFICE 2,421,396

ELECTRICALLY CONTROLLED CAMERA

Morris Schwartz and William Castedello, Stamford, Conn., assignors to The Kalart Company, Inc., Stamford, Conn.

Application April 14, 1944, Serial No. 531,026

13 Claims. (Cl. 95—11)

Our invention relates to improvements in cameras of all types, particularly to improvements in photographic cameras, in which the shutter accessories or attachments used in conjunction with the camera, such as flash bulbs, synchronizers and light beam focusing devices, etc., are electrically controlled.

It is a matter of practical experience that many pictures are lost because the photographer forgets or neglects to uncover the sensitized layer before the shutter is operated for photographic exposure of the sensitized layer. Pictures lost by such oversight or neglect can very often not be repeated but are permanently lost.

One object of our invention is novel means by which any danger of a loss of pictures due to a failure to uncover the sensitized layer in the camera is eliminated.

Another object of our invention is to provide novel and improved means by which an operation of the shutter or accessories of the camera is prevented unless and until the sensitized layer is uncovered for photographic exposure.

Another object of our invention is to provide novel and improved means by which the shutter and any other part of the camera or any attachments or accessories of the camera are rendered inoperative as long as the sensitized layer in the camera is not or only partly uncovered.

Another object of our invention is to provide novel and improved switch means which disconnect the control circuits of the camera as long as the sensitized layer in the camera is not or only partly uncovered.

Another object of our invention is to provide novel and improved switch means for controlling the control circuits of the camera which switch means are held open when the slide of a plate or film holder inserted in the camera covers the plate or film and which will close automatically when the slide is withdrawn to uncover the plate or film.

Another object of our invention is to conserve battery current by keeping the control circuits inoperative until and unless the operator has inserted his film or plate holder into the camera and has removed the slide therefrom preparatory to making his exposure.

Other and further advantages and objects of our invention will be hereinafter set forth and other features thereof by the appended claims.

Referring to the drawings which illustrate a preferred embodiment of our invention but to which our invention is by no means restricted since the drawings are merely shown by way of illustration and not by way of limitation.

Figure 1 shows a rear view of a camera equipped with switch means according to our invention, the wire connections for the electrically controlled parts and attachments or accessories of the camera being omitted.

Figure 2 shows diagrammatically a side view of the camera, a plate holder being inserted holding the switch means according to our invention in their open position.

Figure 3 shows a plan view of switch means according to our invention and also a circuit diagram for an electromagnetically operated shutter and a flash bulb controlled by the switch means.

Figure 4 is a side view of the switch means shown in Figure 3.

The camera shown in the drawings and particularly in Figure 1 may be equipped with an electromagnetically operated shutter, connections for one or more flash bulbs, electrically operated attachments or accessories such as a light beam focusing device and with a source of current such as a battery for the operation of the electrically operated devices associated with or to be used in conjunction with the camera. Since the electrically operated devices are not part of our invention, they are not described or illustrated in detail. The camera is further equipped with various control means such as switch means, a synchronizer, a release button, etc., for controlling the electrically operated devices associated with the camera. These control means are preferably arranged in compartments of the casing 1 of the camera.

Figure 3 shows a circuit diagram for a photographic camera of the type previously described. The circuit diagram comprises an electromagnet 2 for actuating the shutter 3 and a flash bulb 4. Electromagnet 2 is connected to one terminal of a battery 5 through leads 6 and 7 and to the other terminal through a lead 8, a lead 9, a switch 10, switch means 11 according to our invention which will be more fully explained hereinafter and a lead 12. Flash bulb 4 is connected to the battery through leads 9 and 13 respectively. The battery is preferably placed in the casing of the camera. The flash bulb or bulbs may be inserted in sockets provided in the camera casing or otherwise connected to the camera. It is only essential that the ignition of the flash bulbs is controlled by control means associated with the camera. In addition to the shutter and the flash bulb other electrically operated devices such as a light beam focusing device known under the trade mark "Focus Spot" may be included in the control circuits. The control circuits may further include an electrically operated or controlled timing device to secure proper timing of the operation of the shutter and a flash bulb. Switch 10 serves to close control circuits of the electrically operated devices and may be designed as release button of the camera.

Control systems of the type shown diagrammatically in Figure 3 are described and illustrated more fully in our copending patent application Ser. No. 521,378, filed February 7, 1944.

Assuming now that switch means 11 are closed, it will be apparent that the shutter, the flash bulb and any other electrically operated devices which may be connected with the control circuits can be controlled by switch 10.

As previously explained, many pictures are lost by operating the release button or switch 10 without properly uncovering the plate or film in the camera for photographic exposure. The photographer will operate the release button in the mistaken belief that he has exposed the plate or film by removing the slide of the plate holder and it will be frequently impossible to repeat the picture when the mistake is discovered.

According to our invention switch means 11 are provided to prevent an operation of the shutter or other suitable electrically operated devices associated with the camera by rendering the control circuits inoperative as long as the slide of the plate or film holder is not removed to uncover the plate or film for photographic exposure. Consequently, the photographer will immediately notice his neglect when he tries to take a picture.

The switch means according to our invention comprise two relatively movable members or levers 14 and 15 each being supported pivotally at one end. The other ends of the levers are connected to permit the levers to move either into the prone position as shown in Figure 2 or into the angular position as shown in Figure 4. This purpose can be accomplished by various suitable means. According to a preferred embodiment the end 16 of lever 14 is forked and provided with an elongated guiding slot 17. The end 18 of lever 15 is set off and fitted between the prongs of forked end 16. A pin 19 passed through slot 17 and a corresponding hole in end section 18 of lever 15 serves as a pivot for levers 14 and 15. Lever 15 is pivotally supported by means of a pivot pin 20 and lever 14 by means of a pivot pin 21 which is extended to form a crank 22. This crank will make a swinging movement when levers 14 and 15 are moved from their prone position into their angular position. It engages a resilient contact for example a spring contact 24 fastened to a support 25 made of insulating material by any suitable means. Spring contact 24 cooperates with a contact 26 also fastened to insulating support 25. The spring contact is arranged to engage contact 26 and to urge crank 22 into a position in which lever 14 keyed to the crank and lever 15 are in their angular position shown in Figure 4. Consequently the angular position of the levers is their normal or rest position into which they will tend to move and in which contacts 24, 26 are closed, while in the prone position of the levers crank 22 will hold spring contact 24 separated from contact 26.

It should be noted that instead of the crank arrangement shown in the drawings any other arrangement can be used in which movements of the levers or equivalent elements control the contacts included in the control circuits.

The movement and position of levers 14 and 15 are controlled by the position of a slide 30 of a plate or film holder 31 inserted in the camera and secured to it by any suitable or conventional clamping means, preferably by a conventional spring back 47 pressing the holder against the casing. The spring back is diagrammatically shown in Fig. 2. As can best be seen on Fig. 2, spring back 47 is pressed against plate or film holder 31 by a leaf spring 41. The lower end of this spring is pivoted to spring back 47 by means of an ear 43 engaging a pin 42 fastened to spring back 47. The upper end of spring 41 is provided with an ear 46 having an elongated slot 45 which engages a pin 44 fastened to the spring back, thereby permitting a tilting of the spring back away from the holder 31 for inserting the same between the spring back and camera casing 1. Slide 30 when in a position covering a plate or film 32 inserted in holder 31 will force and hold the levers in their prone position shown in Figure 2 in which the contacts 24, 26 are disengaged. The slide will release the levers to be moved by the action of spring contact 24 into their angular position shown in Figure 4 in which contacts 24, 26 are closed when it is removed to uncover the plate or film 32 for photographic exposure. We accomplish this by mounting the levers at a point of the casing where they will protrude into the path of the slide and hence will be forced into their prone position by a slide inserted in holder 31. A position preferred for this purpose is a position close to and parallel with the edge 33 of the frame 34 of the camera casing as shown in Figure 1. The levers may be pivotally mounted on the frame by providing a recess 35 having semi-cylindrical grooves 36 and 37 in the bottom. Groove 36 ends preferably in a larger semi-cylindrical groove 38 while groove 37 is extended through the width of frame 34. A cover 39 having corresponding grooves at its lower side is fitted into recess 35 flush with the frame 34 and secured to it by screws or other suitable means. The grooves in the frame and in the cover register to form bearings for pin 21 and pin 20 which preferably has a head 40 fitted into groove 38 to secure the levers to the frame.

It should of course be understood that any suitable means may be employed to fasten the switch means 11 to the casing of the camera.

When the plate or film holder is removed the spring back of the camera will hold the switch means 11 in their open position, the spring back then taking the place of the slide. We hereby prevent any operation of the shutter, etc., and hence a drainage of the battery unless and until the holder is inserted and the slide is removed.

While our invention has been described in detail with respect to certain particular embodiments it will be understood by those skilled in the art after understanding our invention that various changes and modifications may be made without departing from the scope of our invention and it is intended, therefore, to cover all such changes and modifications in the appended claims.

What is claimed as new and to be secured by Letters Patent is:

1. A circuit system for controlling electrically operated devices associated with a photographic camera having a casing and guiding means thereon for receiving a holder for a sensitized layer including a slide for covering and uncovering the sensitized layer, said circuit system including a switch means, said switch means comprising relatively movable elements, contact members controlled by the relative position of the movable elements, and means for urging the movable elements into a relative position in which the contact members are in contact, said movable elements being placed and arranged to be held by the slide of a holder inserted in the camera in a relative position in which the contact members are disengaged and to move into their relative position in which the contact members are in contact in response to a removal of the slide.

2. A circuit system for controlling electrically operated devices associated with a photographic camera having a casing and guiding means thereon for receiving a holder for a sensitized layer including a slide for covering and uncovering the sensitized layer, said circuit system including a switch means, said switch means comprising relatively movable elements and two contact members, one of the contact members being resilient and arranged to move the movable elements into a predetermined relative position in which the contact members are in engagement, said movable elements being placed and arranged to be held by the slide of a holder inserted in the camera in another predetermined position in which the contact members are disengaged.

3. A circuit system for controlling electrically operated devices associated with a photographic camera having a casing and guiding means thereon for receiving a holder for a sensitized layer including a slide for covering and uncovering the sensitized layer, said circuit system including a switch means, said switch means comprising relatively movable elements, relatively movable contact members, means operatively connecting the movable elements with the movable contact members for changing the relative position of the contact members in response to a change of the relative position of the movable elements and resilient means for moving the movable elements into a predetermined relative position, said movable elements being placed and arranged to be held in another relative position by the slide of a holder inserted in the camera.

4. A circuit system for controlling electrically operated devices associated with a photographic camera having a casing and guiding means thereon for receiving a holder for a sensitized layer including a slide for covering and uncovering the sensitized layer, said circuit system including a switch means, said switch means comprising relatively movable elements arranged to assume an angular relative position and a substantially prone relative position, relatively movable contact members, lever means operatively connecting the movable elements with the contact members for changing the relative position of the contact members in response to a change of the relative position of the movable elements and spring means for urging the movable elements into the angular position, said movable elements being placed and arranged to be held in a prone relative position by the slide of a holder inserted in the camera and to move into their angular position in response to a removal of the slide.

5. A circuit system as described in claim 4 in which the relatively movable elements are pivotally fastened to the casing of the camera and arranged to protrude into the path of the slide of a holder inserted in the camera in their angular position.

6. A camera having a casing, a guiding means thereon arranged to receive a holder for a sensitized layer including a slide for covering and uncovering the sensitized layer, and a circuit system for controlling electrically operated devices associated with the camera in combination with a switch means supported on the casing and controlled by the position of the slide in the holder for rendering said circuit system inoperative when and while the slide is placed in a holder inserted in the camera.

7. A camera having a casing, a guiding means thereon arranged to receive a holder for a sensitized layer including a slide for covering and uncovering the sensitized layer, and a circuit system for controlling electrically operated devices associated with the camera in combination with a switch means supported on the casing and controlled by the position of the slide in the holder, said switch means being placed and arranged to be held in an open position by the slide for rendering the circuit system inoperative for the control purposes aforesaid when and while the slide is placed within a holder inserted in the camera.

8. A camera having a casing, a guiding means thereon arranged to receive a holder for a sensitized layer including a slide for covering and uncovering the sensitized layer, and a circuit system for controlling electrically operated devices associated with the camera in combination with a switch means supported on the casing and controlled by the position of the slide in the holder, said switch means being placed and arranged to extend into the path of the slide when inserted in the holder and to be held in an open position when engaged by the slide thereby rendering the circuit system inoperative for the control purposes aforesaid.

9. A camera having a casing, a guiding means thereon arranged to receive a holder for a sensitized layer including a slide for covering and uncovering the sensitized layer, and a circuit system for controlling electrically operated devices associated with the camera in combination with a switch means supported on the casing and controlled by the position of the slide in the holder, said switch means being placed and arranged to be moved by the slide into a position rendering the circuit system inoperative for the control purposes aforesaid when engaged by the slide and to be moved into a position rendering the circuit system operative when disengaged from the slide.

10. A circuit system for controlling electrically operated devices associated with a photographic camera having a casing and guiding means thereon for receiving a holder for a sensitized layer including a slide for covering and uncovering the sensitized layer, said circuit system comprising a switch means, and a means for urging the switch means into a position on the camera casing in which it is engaged by a slide within a holder inserted in the camera, such engagement causing the switch means to be moved into a position rendering the circuit system operative for the purposes aforesaid.

11. A circuit system for controlling electrically operated devices associated with a photographic camera having a casing and guiding means thereon for receiving a holder for a sensitized layer including a slide for covering and uncovering the sensitized layer, said circuit system comprising a switch means including relatively movable elements and contact members controlled by the relative position of the movable elements, and means for urging the relatively movable elements into a position in which the contact members are disengaged thereby rendering the circuit system inoperative for the control purposes aforesaid, said switch means being mounted in a position on the camera casing in which it is engageable by a slide within a holder inserted in the camera, such engagement causing the switch means to be moved into a position rendering the circuit system operative for the control purpose aforesaid.

12. A camera having a casing, a guiding means thereon arranged to receive a holder for a sensitized layer including a slide for covering and uncovering the sensitized layer, and a circuit system for controlling electrically operated devices associated with the camera in combination with a switch means supported on the casing and controlled by the position of the slide in the holder, said switch means being placed and arranged to be capable of being held in a position rendering the circuit system inoperative for the control purposes aforesaid by the back of the camera.

13. A camera having a casing, a guiding means theron arranged to receive a holder for a sensitized layer including a slide for covering and uncovering the sensitized layer, and a circuit system for controlling electrically operated devices associated with the camera, in combination with a switch means controlled by the position of the slide in the holder for rendering said circuit system inoperative when the slide is in an inserted position in a holder placed in the camera.

MORRIS SCHWARTZ.
WILLIAM CASTEDELLO.

REFERENCES CITED

The following references are of record in the file of this patent:

UNITED STATES PATENTS

| Number | Name | Date |
| --- | --- | --- |
| 1,974,592 | Wolfgram | Sept. 25, 1934 |
| 1,894,004 | Rose | Jan. 10, 1933 |
| 1,712,854 | Thonet | May 14, 1929 |
| 2,281,193 | Hollingsworth | Apr. 28, 1942 |
| 2,222,666 | Jacobson et al. | Nov. 26, 1940 |